United States Patent [19]

Proulx

[11] 4,020,504
[45] Apr. 26, 1977

[54] AUTOMATIC MAGNETIC RECORD SHEET COPYING APPARATUS

[75] Inventor: Arthur Z. Proulx, Birchwood Village, Minn.

[73] Assignee: Minnesota Mining and Manufacturing Company, St. Paul, Minn.

[22] Filed: Mar. 24, 1975

[21] Appl. No.: 561,611

[52] U.S. Cl. .................................. 360/17; 360/2; 235/61.11 D
[51] Int. Cl.² .................. G11B 25/04; G11B 5/80
[58] Field of Search .......... 360/17, 15, 16, 97–99, 360/2; 274/42 R, 42 P; 235/61.11 D, 61.12 M

[56] References Cited

UNITED STATES PATENTS

| | | | |
|---|---|---|---|
| 2,247,905 | 7/1941 | Bryce | 360/2 |
| 2,999,907 | 9/1961 | Hoshino et al. | 360/17 |
| 3,070,374 | 12/1962 | Nakamatsu | 360/2 |
| 3,602,649 | 8/1971 | Rin | 360/17 |
| 3,721,775 | 3/1973 | Fujimoto et al. | 360/17 |

Primary Examiner—Alfred H. Eddleman
Attorney, Agent, or Firm—Cruzan Alexander; Donald M. Sell; William B. Barte

[57] ABSTRACT

In an automatic magnetic record sheet copying apparatus in which a master sheet having a master magnetic record thereon is pressed together with a blank magnetic copy sheet and an external magnetic field is superimposed thereon to enhance duplication of the magnetic record onto the copy sheet, means are provided for automatically transferring blank copy sheets from a supply of such sheets to a copying station wherein the duplication of the master record onto the blank copy sheet is effected and for automatically transferring the recorded copy sheet to a discharge station. The apparatus precisely positions the copy sheet together with the master magnetic record to ensure that the duplicated magnetic record on the copy sheet is precisely located thereon.

7 Claims, 6 Drawing Figures

AUTOMATIC MAGNETIC RECORD SHEET COPYING APPARATUS

BACKGROUND OF THE INVENTION

1. Field of the Invention

This invention generally relates to copying a magnetic record previously recorded on a magnetic master medium onto a blank magnetic copy medium, and is specifically directed to bulk duplication of magnetic records onto sheet-type magnetic copy media.

2. Description of the Prior Art

Processes for bulk duplication of magnetic records have long been sought in order to reduce the expense of producing copies thereof. Bulk duplication processes are those in which all of the magnetically recorded information is copied essentially simultaneously, as opposed to serial duplication processes, such as the process wherein a master medium having a master magnetic record thereon is moved past a playback head to generate an electrical signal which then drives one, or more recording heads in parallel, to reproduce the magnetic record from the master medium onto a copy medium.

It is known to bulk duplicate magnetic records by contacting a magnetic master medium with a magnetic copy medium, preferably having a coercivity less than that of the master medium, to cause the magnetic fields associated with the master record to alter the magnetization of the copy medium. In such a process, it may be preferable to apply an external magnetic field to bias the magnetic state in the copy medium, thereby enhancing the alteration of magnetization of the copy medium. See U.S. Pat. No. 2,738,383 (Herr & Marchant). To the extent that such a technique is used with a conventional magnetic tape format, it is not truely bulk duplication, since the master tape and copy tape must be run from separate supply reels, momentarily contacted while in a signal transfer stage and then rewound on takeup reels.

U.S. Pat. No. 3,602,649 to Rin describes a device for contact duplication of magnetic records onto sheet-type magnetic copy media wherein a master sheet is contacted with a copy sheet and a magnetic field is applied to the contacted sheets. While such a device enables true bulk duplication of the recorded information, full economies of mass bulk duplication are not afforded inasmuch as no capability of automatically contact duplicating the magnetic record from the master sheet onto a plurality of copy sheets is provided.

SUMMARY OF THE INVENTION

The apparatus of the present invention provides a capability of automatically feeding blank copy sheets from a supply stack to a copying station and for transferring thus processed copy sheets from the copying station to a discharge tray. The copying station includes a magnetically permeable top surface having a plurality of alignment pins projecting therefrom for receiving and aligning a master sheet having a master magnetic record thereon and a blank magnetic copy sheet, the sheets having a plurality of openings positioned to match the location of said alignment pins such that said received sheets are precisely aligned. The apparatus further includes mechanisms for pressing together the aligned master and copy sheets, and for impressing a magnetic field on the pressed together sheets to enhance the bulk duplication of the master magnetic record onto the copy sheet. The apparatus also includes a supply station for receiving, aligning and supporting a stack of blank copy sheets a predetermined horizontal distance from the copying station. Another mechanism precisely vertically lifts a top sheet from the stack of blank sheets and horizontally transports the lifted top sheet the predetermined horizontal distance from the supply station to the copying station. This mechanism further precisely vertically lowers the transported copy sheet onto the copying station and engages the openings in the transported copy sheet with the alignment pins. The mechanism thus ensures that a plurality of the blank copy sheets may repeatedly be transferred the predetermined distance from the top of the stacked supply to the copying station precisely aligned together with the master sheet thereat. Still another mechanism transports the recorded copy sheet from the copying station to a discharge station for receiving, stacking and supporting the recorded copy sheet. By providing such precise control over the movement of each blank copy sheet, the apparatus of the present invention ensures that a magnetic record positioned at a predetermined location on a master sheet may be automatically bulk duplicated onto precisely the same relative location on a plurality of blank copy sheets by repeated transporting, aligning and pressing together of the respective copy sheets and a master sheet in the presence of the magnetic field.

In a preferred embodiment, both of the transporting mechanisms are affixed to portions of a walking beam such that during a single transversal of the beam, blank and recorded copy sheets may be transported to and from the copying station respectively.

The importance of the feature of the present invention whereby the precise alignment of the blank copy sheet and master sheet is effected is that it is essential that the resultant duplicated recording on the copy sheet be precisely located with respect to the alignment holes on the copy sheet so that the recorded copy sheets can be used in any one of a plurality of recording reproduction devices such as that described in U.S. Pat. No. 3,074,724 to Fijimoto. Such devices position the recorded copy sheets (having a spiral track recorded thereon) on a stationary planar reproduction station via the alignment holes and transverse the track by a rotating transducer which is simultaneously driven radially by a powered screw. Since the instantaneous postion of the transducer is thus fixed, the record sheet and the recording thereon must be precisely positioned such that the center of the track is always centered with the position of the transducer. A mis-alignment of as little as a few thousandths of an inch will result in a "wow" and "flutter"-like distortion, while greater misalignments will result in a lower output or complete inarticulateness of the reproduced information.

DESCRIPTION OF THE PREFERRED EMBODIMENTS

Figures 1, 2:
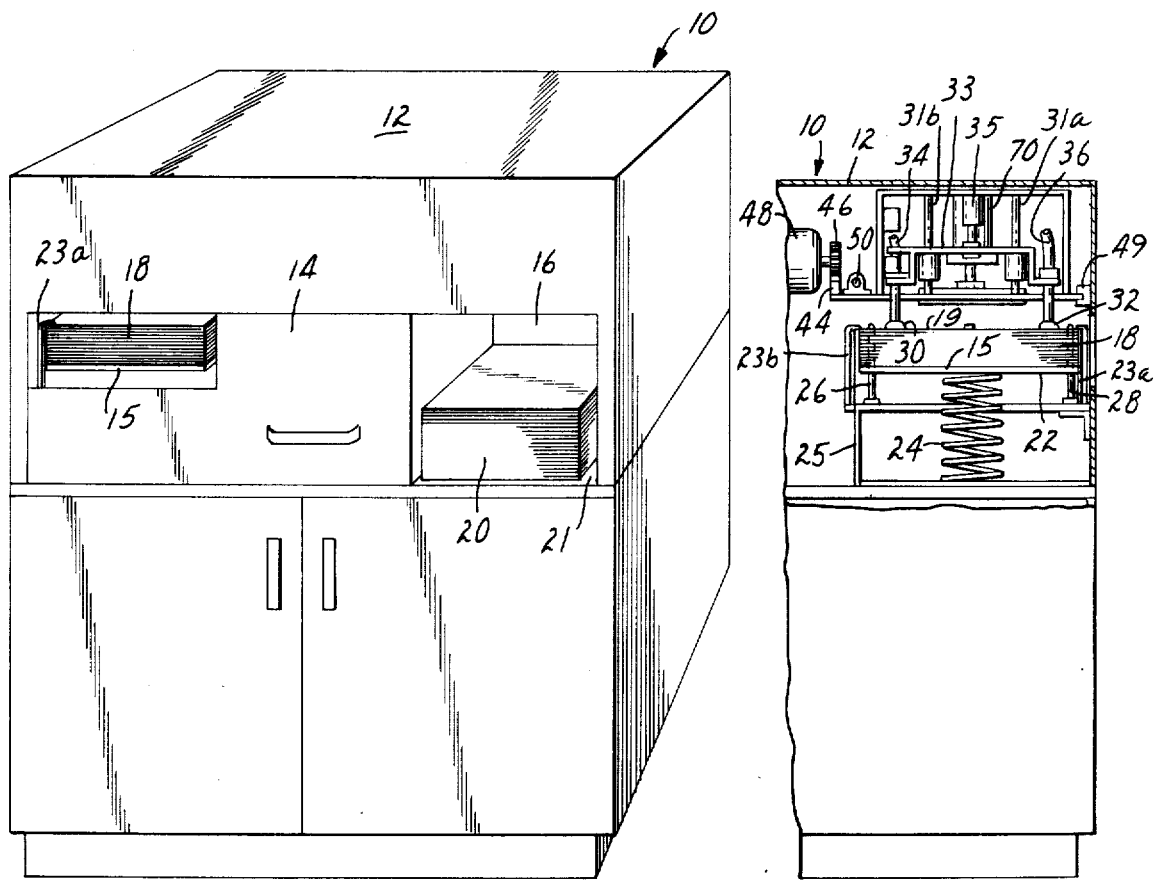
FIG. 1 is a front perspective view of the apparatus of the present invention.
FIG. 2 is a partially exposed side view of a portion of the left side of the apparatus shown in FIG. 1.

In the preferred embodiment of the present invention shown in FIG. 1, the apparatus 10 is shown to include an outer enclosure 12 having two openings in the front portion therof, a first opening 14 for enabling a supply of magnetic copy sheets 18 to be inserted onto a feed tray 15, and a second opening 16 for enabling processed copy sheets 20 to be extracted from a discharge tray 21. In one embodiment, feed tray 15 supporting the supply of blank copy sheets 18 and portions of a copying station (to be described in more detail hereinafter) are desirably slidemounted to enable withdrawal from the enclosure 12, thereby facilitating the insertion of a fresh supply of blank copy sheets 18 and the insertion and removal of master sheets.

The manner in which blank copy sheets are transported from the stack of blank sheets 18 to the copying station is shown in the sectional view of FIG. 2. In that figure, the feed tray 15 suuporting the stack of blank copy sheets 18 is shown to have a flat bottom surface 22 which is mechanically biased upwardly by the coil spring 24, the bottom portion of which is supported by the frame of the apparatus 25. The supply of blank sheets 18 is aligned by the alignment pins 26 and 28 respectively, which pins are immovably mounted on the frame 25. As sheets are extracted from the top of the supply of sheets 18, the supply moves upwardly, sliding along the alignment pins 26 and 28. A number of retaining clips 23a and 23b are positioned around the periphery of the stack 18 to prevent the top sheet from rising above the level of the top guiding surface of the aligning pins 26 and 28. These clips are positioned such that the sheets are secured, but yet are readily released as appropriate. The top sheet 19 in the supply of sheets 18 is extracted from the stack by a first lift station 33, which is controllably raised and lowered along guides 31a and 31b by a double acting vacuum cylinder 35. Extending from the bottom of the lift station 33 is a set of four vacuum actuated lift cups, two of which are shown as 30 and 32. These cups are coupled through vacuum lines 34 and 36 via appropriate electrically controlled solenoid valves to a conventional vacuum pump (not shown) and, when actuated, secure the top sheet of copy paper 19 to the first lift station to enable the sheet to be lifted from the stack 18.

Figure 3:
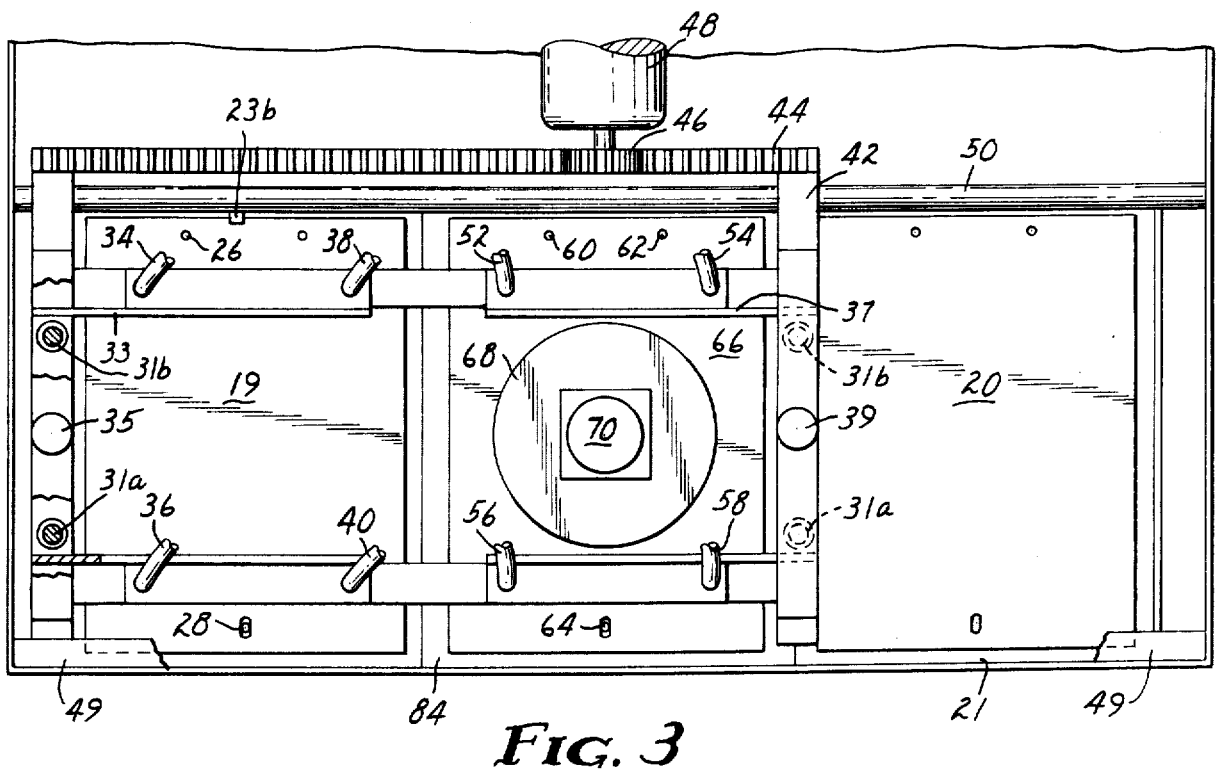
FIG. 3 is an exposed top view of a portion of the apparatus shown in FIG. 1.

FIG. 3 clearly shows the mechanism for moving the top sheet 19 once it is lifted from the stack 18 to the copying station. A key feature of this mechanism is a walking beam 42 having a rack 44 coupled to a pinion gear 46, which pinion is driven by a motor 48 when suitably energized. The walking beam 42 is mounted within the apparatus 10 on a fixed channel 49 and on a shaft 50 so as to be readily transported along a horizontal direction, and includes the first lift station 33 controlled by vacuum cylinder 35 and a second lift station 37 controlled by vacuum cylinder 39. The supporting framework is shown broken away to futher reveal the guides 31a and 31b and the bushings associated therewith, thus ensuring precise vertical movement. The second station 37 is identical to the first station 33 and is supported in like fashion. Each can be independently actuated. The four lift cups in the first station 33 are coupled through vacuum lines 34, 36, 38 and 40 to a common manifold and thence to an electrically controlled valve. Similarly, the four lift cups in the second station 37 are coupled through vacuum lines 52, 54, 56 and 58.

In FIG. 3, the second lift station 37 is shown positioned over a portion of the apparatus defining the copying station. This station includes a flat base formed of a magnetically permeable material such that a magnetic field emanating from below the base, such as that disclosed in U.S. Pat. No. 3,602,649 (Rin), passes therethrough without appreciable attenuation. Three alignment pins 60, 62 and 64 extend upwardly from the base, and precisely define the copying station. These pins and the similarly positioned alignment pins 26 and 28 are precisely positioned with respect to each other and with respect to the end positions of the walking beam 42 and the traversal distance thereof such that a copy sheet 19 is lifted off the alignment pins 26 and 28 without shifting or "cocking" the sheet, is transported over the pins 60, 62 and 64 (such as sheet 66) and is lowered onto the pins into precise alignment with a master sheet 82 (shown in FIGS. 4–6) already positioned on the pins.

Positioned above the sheet 66 is a platen 68 which is adapted to be lowered to thereby press the copy sheet 66 together with the master sheet 82 by vacuum cylinder 70. The discharge tray 21 for receiving the processed copy sheets 20 is shown at the right side of the figure.

Having now described the general features of the apparatus of the present invention, the sequence of operations by which blank copy sheets are transported into a copying station, the master magnetic record is copied onto the blank copy sheet and the blank copy sheet is then extracted from the copying station and stacked in a discharge pile will now be described in detail in conjunction with FIGS. 4–6.

Figure 4:
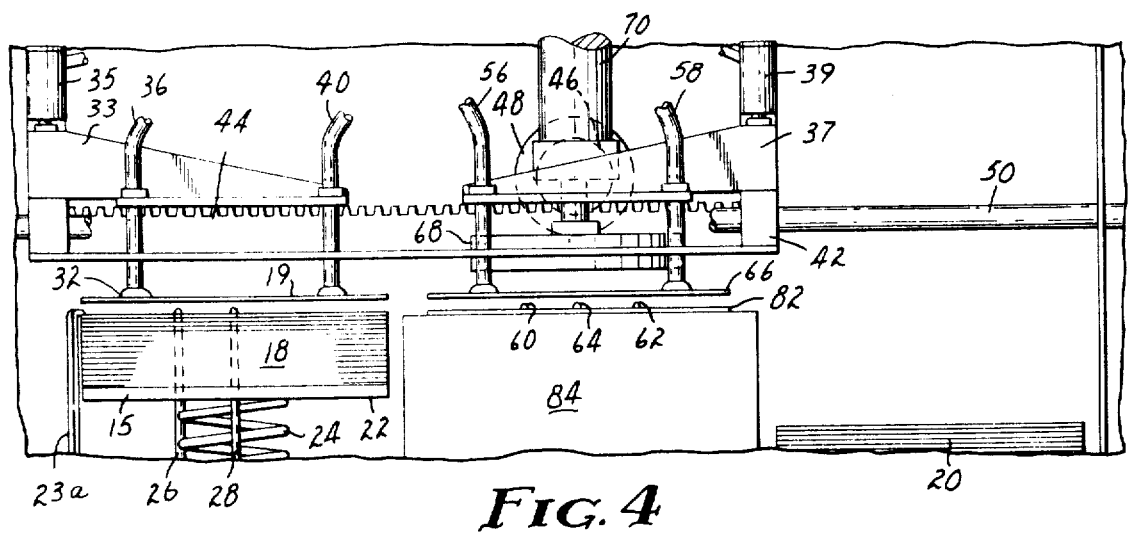
FIGS. 4–6 are exposed side views of a portion of the front of the apparatus shown in FIG. 1 showing the apparatus in various phases of operation.

In FIG. 4 the walking beam 42 is shown positioned such that the first lift station 33 is positioned above the supply of blank copy sheets 18 while the second lift station 37 is positioned over the copying station. In this position, the air cylinders 35 and 39 are energized to lower the respective lift stations and the lift cups 30, 32, etc. are evacuated, thus causing the top sheet 19 to be temporarily secured to the cups of the first lift station 33 and a processed copy sheet 66 to be temporarily secured to the cups of the second lift station 37. The vertical guides for the lift stations 33 and 37 are not shown in FIGS. 4–6.

Figure 5:
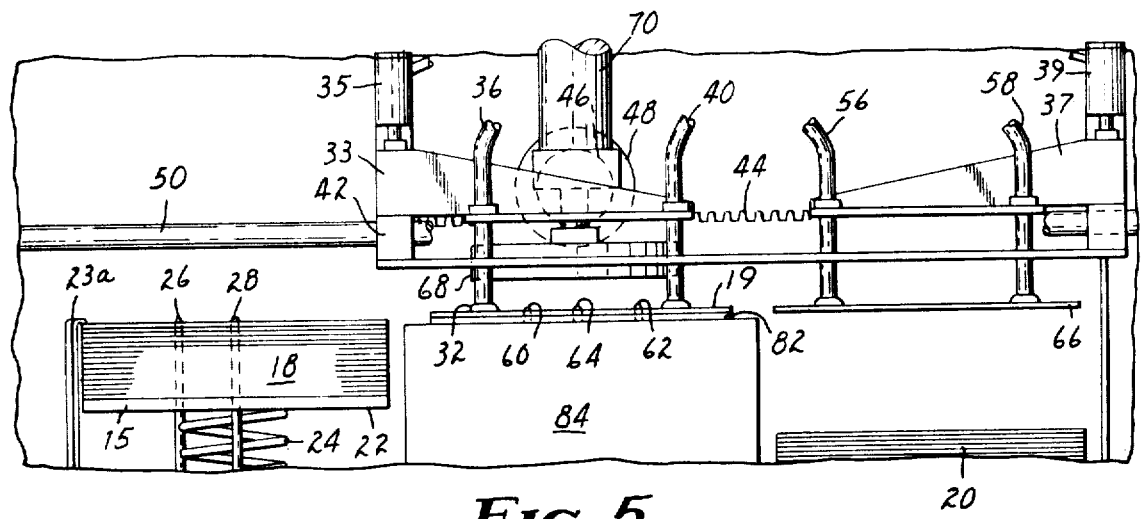

When copy sheets 19 and 66 are thus secured to the respective lift cups, the lift stations 33 and 37 are raised and the motor 48 is energized, thereby driving the pinion gear 46 and causing the rack 44 and the walking beam 42 to be traversed to the right into the position depicted in FIG. 5. The rate at which the first lift station is raised is controlled by appropriate needle valves or like devices such that the openings in the copy sheets are not damaged as the sheets are extracted from the alignment pins 26 and 28, and such that the alignment of the sheets is not shifted. In the position shown in FIG. 5, the blank copy sheet 19 is now accurately positioned over the master sheet 82 such that the positioning holes on the copy sheet are over the alignment pins 60, 62 and 64. Similarly, the processed copy sheet 66 is now over the discharge tray 21.

While in this position the lift stations are lowered, the first being lowered slowly and gently so as to ensure that the blank copy sheet 19 is precisely positioned on the alignment pins, and the vacuum cups are de-energized, thereby allowing the blank copy sheet 19 to remain on the master sheet 82. Similarly, the processed copy sheet 66 is allowed to fall into the discharge tray 21.

Figure 6:
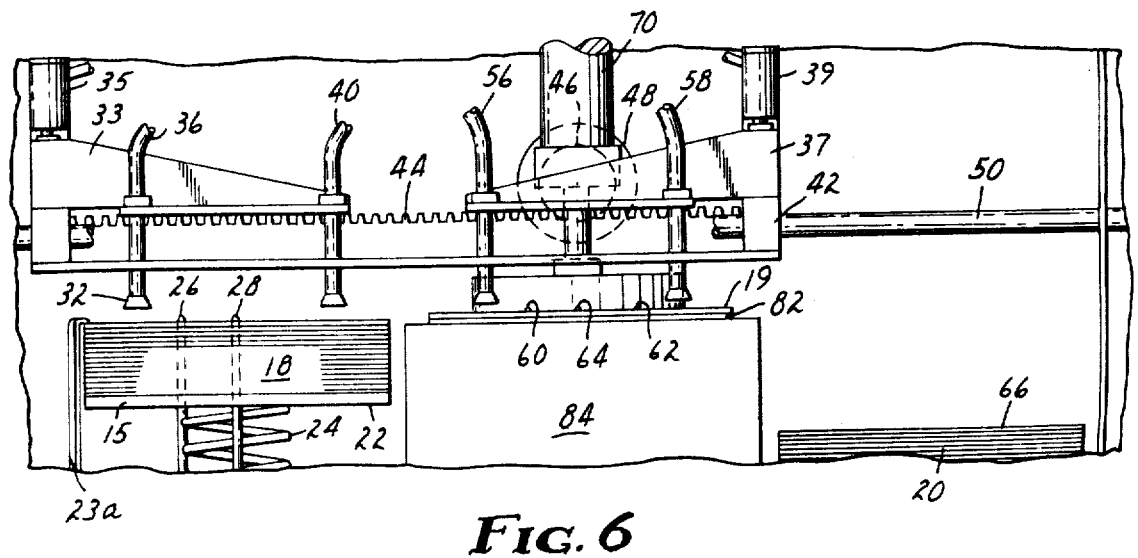

Upon so releasing the copy sheets, the lift stations are raised and the walking beam 42 is driven to the left by proper excitation of the motor 48 to the position shown in both FIG. 4 and in FIG. 6. While the beam 42 is moving to the left, the pressure platen 68 is lowered as shown in FIG. 6 to press the blank copy sheet 19 against the master record sheet 82. Once the platen 68 is lowered, a magnetic field produced by an electromagnetic coil (not shown) within the supporting pedestal 84 is energized to thereby bias the magnetic fields associated with the master magnetic record on the master sheet 82 and to thereby alter the magnetic state of the copy sheet 19. In a preferred embodiment, such an electromagnetic field may desirably traverse the copying station, thereby sequentially applying the magnetic field across the surface of the pressed together master and copy sheets in the manner set forth in the U.S. Pat. No. 3,602,649, the disclosure of which is hereby incorporated by reference. After the magnetic field has thus been applied, the platen 68 is moved upward to the position shown in FIG. 4, the lift stations are lowered and the vacuum cups are actuated to cause a new copy sheet to be attracted to the vacuum cups associated with the first lift station 33 while the now recorded copy sheet 19 is attracted to the vacuum cups in the second lift station 37 as is shown in FIG. 4. At this point, a second cycle of the operation begins. A repeated operation of the above recited phases thus enables the automatic and inexpensive copying of a large number of copy sheets from a single master record such as record 82.

When it is desired to make copies of a second prerecorded master sheet such as 82, the master sheet is merely lifted off the aligning pins 60, 62 and 64 and a new sheet inserted thereon. As set forth herinabove, in one embodiment it is preferable that the copying station including the alignment pins 60, 62 and 64 as well as the spring loaded support 15 for the blank copy sheets to be mounted on a movable carriage which may be withdrawn from the apparatus to facilitate changing the master records and the insertion of additional blank copy sheets.

It should be further understood that while the description hereinabove is directed to a single preferred embodiment, other variations and modifications can be effected within the spirit and scope of the present invention. Thus by way of example only, the supply of blank copy sheets may similarly be supported in any variety of ways so as to present a top sheet of that supply to appropriate means secured to a walking beam arm for transport of a blank sheet to the copying station. Similarly, while in a preferred embodiment a walking beam 42 having two lift stations is shown to be a preferred embodiment for moving a blank sheet from a supply source to the copying station and for moving a copy sheet from the copying station to a recepticle for receiving processed sheets, it is similarly within the scope and spirit of the invention that the position of the respective supply source, copying station and discharge tray may be varied, and that a transferring device requiring two directional or even angular motion about some pivot point may be desired.

It is further considered to be within the scope of one of ordinary skill in the art to devise the requisite controls for energizing the vacuum cups, lift stations, motor for moving the walking beam and for moving the pressure platen, as appropriate during the various phases of the operation. Accordingly, for purposes of simplicity and clarity of disclosure, the various microswitches, solenoids, pressure valves, etc. have not been shown in the description hereinabove.

Having thus described the present invention, what is claimed is:

1. A magnetic record sheet copying apparatus comprising
   a. a copying station including a magnetically permeable top surface having a plurality of alignment pins projecting therefrom for receiving and aligning a master sheet having a master magnetic record thereon and a blank magnetic copy sheet, said sheets having a plurality of openings positioned to match the location of said alignment pins such that said recieved sheets are precisely aligned,
   b. means for pressing together said aligned master and copy sheets, and
   c. means for impressing a magnetic field on said pressed together sheets to enhance the bulk duplication of the master magnetic record onto a thus recorded copy sheet,
wherein the improvement comprises
   d. a supply station including means for receiving, aligning and supporting a stacked supply of blank copy sheets a predetermined horizontal distance from said copying station,
   e. means for precisely vertically lifting a top sheet from said stacked supply, for horizontally transporting a said lifted top sheet a said predetermined horizontal distance from said supply station to said copying station, for precisely vertically lowering the transported top sheet onto said copying station and for engaging the openings in a said transported copy sheet with said alignment pins, thereby ensuring that a plurality of said blank copy sheets may repeatedly be transferred said predetermined distance from the top of said stacked supply and to the copying station precisely aligned together with the master sheet thereat,
   f. a discharge station including means for receiving, stacking and supporting said recorded copy sheets, and
   g. means for transporting a said recorded copy sheet from said copying station to said discharge station, whereby a said magnetic record positioned at a predetermined location on a said master sheet may be automatically bulk duplicated onto precisely the same relative location on a plurality of copy sheets by repeated transporting, aligning and pressing together of the respective copy sheets and a said master sheet in the presence of said magnetic field.

2. A device according to claim 1, comprising a walking beam having said blank copy sheet transporting means affixed to one portion thereof and having said recorded copy sheet transporting means affixed to another portion thereof such that during a single transversal of said beam, blank and recorded copy sheets may be transported to and from said copying station respectively.

3. A device according to claim 2 wherein both of said transporting means include vacuum operated means for temporarily securing a copy sheet thereto and wherein said beam includes means for moving said vacuum operated means into contact with a copy sheet and for then actuating said vacuum operated means to secure a copy sheet thereto.

4. A device according to claim 1, wherein said supply station further comprises a plurality of alignment pins similarly positioned to match openings in said copy sheets for aligning said supply of sheets.

5. A device according to claim 1, wherein said supply station further comprises means for maintaining a top sheet in said stack of blank copy sheets at substantially the same level as the top guiding surface of said alignment pins in said supply station.

6. A device according to claim 5, wherein said level maintaining means comprises a mechanical biasing means for forcing said stack of blank copy sheets upward and a plurality of clips positioned about the periphery of said stack for preventing the top sheet in said stack from rising above the level of said top guiding surface until said top sheet is secured by said blank copy sheet transporting means.

7. A method for copying a magnetic record from a master magnetic record onto a magnetic copy sheet comprising
   a. receiving and aligning at a copying station including a magnetically permeable top surface having a plurality of alignment pins projecting therefrom, a master sheet having a master magnetic record thereon and a blank magnetic copy sheet, said sheets having a plurality of openings positioned to match the location of said alignment pins such that said received sheets are precisely aligned,
   b. pressing together said aligned master and copy sheets, and
   c. impressing a magnetic field on said pressed together sheets to enhance the bulk duplication of the master magnetic record onto a thus recorded copy sheet,
wherein the improvement comprises
   d. receiving, aligning and supporting a stacked supply of blank copy sheets at a supply station positioned a predetermined horizontal distance from said copy station,
   e. precisely vertically lifting a top sheet from said stacked supply, horizontally transporting a said lifted top sheet a said predetermined horizontal distance from said supply station to said copying station, precisely vertically lowering the transported top sheet onto said copying station, and engaging the openings in a said transported copy sheet with said alignment pins, thereby ensuring that a plurality of said blank copy sheets may repeatedly be transferred said predetermined distance from the top of said stacked supply and to the copying station precisely aligned together with the master sheet thereat,
   f. receiving, stacking and supporting said recorded copy sheets at a discharge station, and
   g. transporting a said recorded copy sheet from said copying station to said discharge station,
whereby a said magnetic record positioned at a predetermined location on a said master sheet may be automatically bulk duplicated onto precisely the same relative location on a plurality of copy sheets by repeated transporting, aligning and pressing together of the respective copy sheets and a said master sheet in the presence of said magnetic field.

* * * * *